(12) United States Patent
Bevacco

(10) Patent No.: US 6,182,704 B1
(45) Date of Patent: Feb. 6, 2001

(54) FRANGIBLE SEALING PLUG FOR PIPELINES

(75) Inventor: Marc P. Bevacco, Corcoran, MN (US)

(73) Assignee: Cherne Industries Incorporated, Minneapolis, MN (US)

( * ) Notice: Under 35 U.S.C. 154(b), the term of this patent shall be extended for 0 days.

(21) Appl. No.: 09/333,622

(22) Filed: Jun. 15, 1999

(51) Int. Cl.⁷ ................................................ F16L 55/10
(52) U.S. Cl. ........................ 138/89; 138/90; 137/68.1
(58) Field of Search .............................. 138/89, 90, 91; 137/68.1; 251/294, 339

(56) References Cited

U.S. PATENT DOCUMENTS

| | | |
|---|---|---|
| 3,915,235 | 10/1975 | Hamilton et al. . |
| 4,212,563 * | 7/1980 | Weidler et al. ........................ 138/89 |
| 4,607,664 | 8/1986 | Carney et al. . |
| 4,706,482 * | 11/1987 | Barber ................................... 138/90 |
| 4,739,799 | 4/1988 | Carney et al. . |
| 4,830,214 | 5/1989 | Curliss et al. . |
| 4,936,350 * | 6/1990 | Huber ..................................... 138/90 |
| 5,033,510 * | 7/1991 | Huber ..................................... 138/90 |
| 5,121,847 | 6/1992 | Ellis . |
| 5,186,214 | 2/1993 | Savard . |
| 5,318,075 | 6/1994 | Roll . |
| 5,740,830 | 4/1998 | Mankins . |
| 6,032,515 * | 3/2000 | Huber ..................................... 138/90 |

* cited by examiner

Primary Examiner—James Hook
(74) Attorney, Agent, or Firm—Anthony G. Eggink

(57) ABSTRACT

A frangible sealing plug for pipelines comprising a unitary disc shaped fluid impermeable body having a plurality of score lines on one side, and a peripheral score line on the opposite side adjacent a peripheral sealing structure. The peripheral sealing structure abuts the end of a pipeline section. The impermeable sealing plug is preferably molded of a plastic composition. The plurality of score lines includes at least one radially disposed score line and at least one concentric score line. The frangible sealing plug is positioned in the end of a pipeline section to hold a testing fluid backpressure. After testing, the disc shaped body is separated into a plurality of pieces along the score lines by a removal device.

25 Claims, 2 Drawing Sheets

FRANGIBLE SEALING PLUG FOR PIPELINES

BACKGROUND OF THE INVENTION

The present invention relates to a temporary plug device for pipelines and more particularly to a frangible, fluid impermeable, sealing plug for use in pipeline installations. The frangible plug of the present invention is constructed and arranged to be placed at an access location in a pipeline system as it is being constructed or repaired to temporarily block fluid flow through the pipeline system. The frangible sealing plug of the invention is particularly designed for use in the construction of drain, waste and vent (DWV) plumbing systems of residential or building structures having similar plumbing systems. The frangible sealing plug is constructed and arranged for installation between pipe sections of a sewer line.

Subsequent construction completion, pressure testing of the plumbing installation may be easily performed with the frangible plug in place. When testing is complete, the frangible plug device is broken into pieces by a tool device to provide fluid flow through the pipeline. The separated pieces of the disc plug body are designed and constructed to flow out of the pipeline.

Various pipeline plug devices that temporarily block fluid flow have been proposed and used in the past, however, each such device or assembly has drawbacks and difficulties. For example, temporary plugs that are used may not be properly adapted to effectively and completely restore fill fluid flow upon removal. Incomplete removal may cause obstruction and leakage after the plug removal process. Other plug devices are more expensive, complex assemblies and which require additional time to install. The installation and removal of these and other plugs from pipelines may also be difficult and time consuming.

Another drawback of some prior art plug devices is that they may leak after time has elapsed during installation in the pipeline, thus resulting in inaccurate test results. Furthermore, some plug devices for pipelines are limited for use in specific pipelines and for specific plumbing tasks.

The frangible sealing plug of the present invention is provided to alleviate the problems and shortcomings of the prior art. The frangible plug of the present invention is a unitary structure constructed of a disc-shaped lightweight water impermeable structure, such as a plastic. The frangible disc plugs are inexpensive to manufacture, may be constructed in various sizes to fit a wide variety of pipeline diameters and provide a fixed and constant seal of the plumbing system during building construction.

An object of the present invention is to provide an inexpensive frangible disc plug device that is easily and quickly installed and effectively removable from a pipeline, such as a sewer line. The plug device is designed to be installed in a predetermined location in the sewer pipeline system as it is being constructed. For example, one embodiment is constructed and arranged to be fixed between two pipeline sections and may be accessed by means of a stub and coupling arrangement. After construction and testing of the pipeline system a removal tool is fed through the access to sever the plug body into a plurality of pieces which flow out of the plumbing system. A further benefit of this invention is that the body of the disc plug is constructed and arranged with a novel parting edge or score line arrangement to effect breakage of the plug body into a plurality of pieces to restore full and unimpeded flow of the pipeline.

SUMMARY OF THE INVENTION

The present invention relates to a frangible sealing plug and method for temporary stopping the flow of fluid in pipelines, such as in a sewer line. The sealing plug provides an effective means to seal sewer line pipes during construction through performance testing of the plumbing installation. The plug has a frangible, fluid impermeable body constructed of a plastic composition, such as polystyrene or like material. The plug is comprised of a unitary disc shaped body with a peripheral lip and a ring portion. The disc shaped body has opposing surfaces having an arrangement of score or parting lines which cause the body to be broken away from the sealing ring portion with a removal tool or the like after construction of the plumbing system and testing of the system have been completed. The upstream surface of the plug body has a peripheral score line or parting groove and the body is constructed to withstand a specified fluid backpressure during testing. The opposite or downstream surface has a plurality of intersecting parting grooves. For example, in one embodiment the plurality of score lines intersect diagonally through a common center and has a concentric score line spaced between the center and peripheral edge.

The cooperation of the radial and peripheral score lines disposed on opposite sides of the disc shaped plug body permits the body to be broken away from the ring portion with a removal tool after the required testing of the plumbing system has been completed. The cooperating plurality of radial score lines permit the disc shaped body to break into a plurality of pieces that flow out of the pipe line without clogging and to restore full fluid flow. The sealing plug has cooperating score or parting lines constructed and arranged in the plug body to yield a plurality of separated plug body portions when subjected to an external force to restore full fluid flow in the pipeline. Further, construction and body compositions as well as score line or breakage groove structures are disclosed in the teachings of this invention.

These and other benefits of this invention will be become clear from the following description by reference to the drawings.

DESCRIPTION OF THE PREFERRED EMBODIMENTS

The present invention relates to a frangible sealing plug for temporarily sealing a pipeline. The frangible sealing plug of this invention is constructed and arranged to seal a pipeline, such as a sewer line, during construction of a plumbing system and through performance testing of the plumbing system. For example, the sealing plug is particularly adapted for use in drain, waste and vent (DWV) plumbing systems of a residential or like buildings having such plumbing systems. The frangible sealing plug has score or parting lines which cooperate to break the plug body into a plurality of pieces when subjected to a removal device, such as a rotary cutting and pushing tool. The pieces of the plug body flow out of the pipeline which is then made operational permitting full fluid flow.

A sewer line, for example, is typically comprised of a number of pipeline sections. The sealing plug of the present invention is constructed and arranged to fit between two such sections of pipeline. The sealing plug can be glued between sections of the pipeline and/or subsequently secured with a stub and coupling, for example. A 2-way clean out can then be secured onto the sewer line to provide an access for pressure testing and subsequent removal of the temporary frangible plug. Any suitable adhesive, such as a solvent cement, for example, may be used to secure the plug between sections of plastic pipe, for example PVC or ABS pipes, which is commonly used in sewer line systems.

Figure 1:
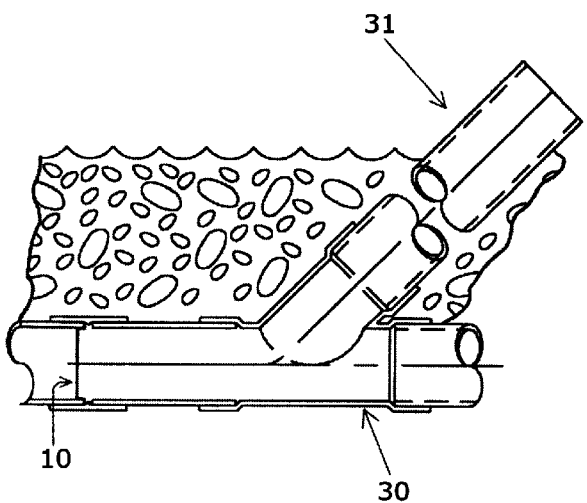
FIG. 1 is an elevational view showing the frangible sealing plug of the present invention installed in a sewer line.
Figure 2:
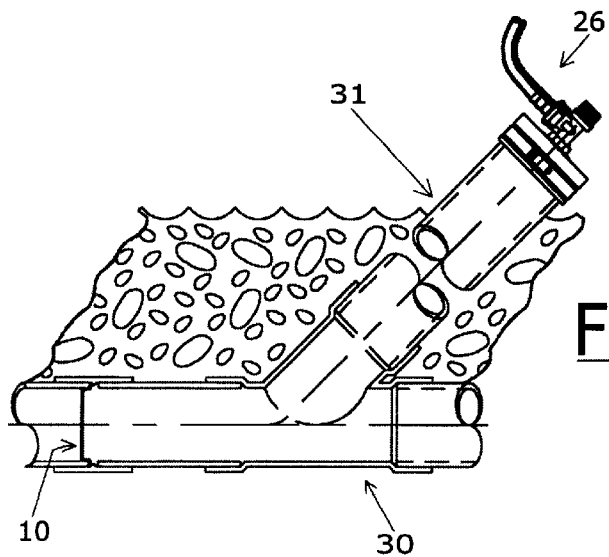
FIG. 2 is an elevational view showing a testing apparatus positioned in the access portion of the sewer line.
Figure 3:
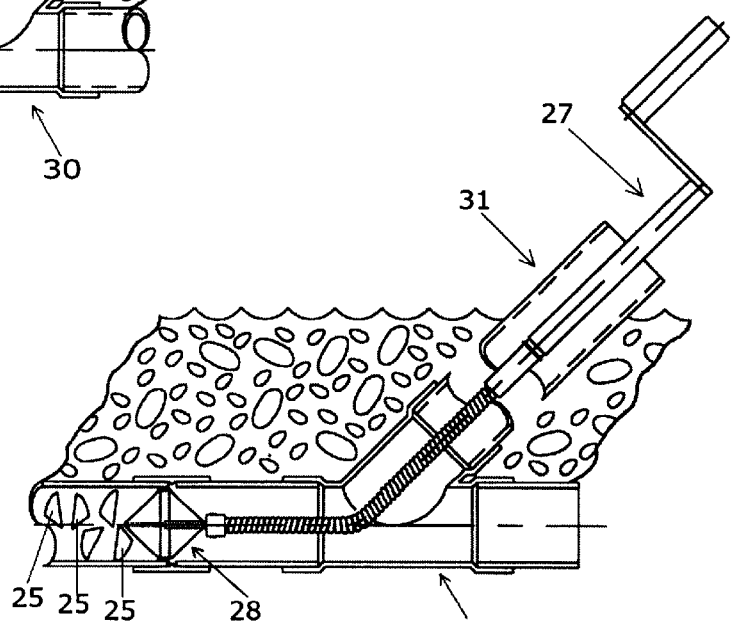
FIG. 3 is an elevational view showing a removal tool separating the disc shaped body of the frangible sealing plug into a plurality of pieces.

FIGS. 1–3 show the frangible sealing plug 10 of the present invention installed in a sewer line 30. FIG. 1 shows a 2-way clean out, or access pipe 31, attached to the sewer line 30. An access pipe 31, such as a sanitary Tee or Y, may be used as the 2-way clean out. An access pipe 31 is shown attached to the main sewer line 30 which is part of a DWV system in a house or building. FIG. 2 shows a testing apparatus 26 positioned through the access pipe 31. The frangible disc plug 10 is shown positioned in the sewer line 30 and the testing apparatus 26 is used to fill and test the DWV system. The frangible sealing plug 10 is constructed and arranged to hold fluid backpressure required in plumbing installations. For example, the plugs may be installed in any diameter pipe used in plumbing systems, such as in three and four inch diameter sewer lines, and are constructed to hold back approximately 30 feet of fluid head pressure.

FIG. 3 shows a removal tool 27 inserted through access 31 into the pipeline 30 for removing the disc shaped body 13 of the frangible sealing plug 10 after testing of the building plumbing system has been completed. Preferably, the removal tool 27 has a head member 28 which has a front and a rear portion, as shown. The front portion may be used to cut, push, and/or rotate to remove the disc shaped body 13 from the ring portion 11 of the sealing plug 10. The rear portion provides easy return of the removal tool through the pipeline and out the access 31. The frangible sealing plug 10 is shown in FIGS. 4–9.

After pressure testing is complete, removal tool 27 with head member 28 is fed through access 31 and used to remove the disc shaped body 13 of disc plug 10 by separating the disc shaped body 13 into a plurality of pieces 25. The removal tool 27 is constructed and arranged to break the disc shaped body 13 into pieces 25 along the parting lines or score lines 15, 17 and 18 and the individual pieces 25 flow out of the pipeline 30 to allow the DWV system to drain and to restore full fluid flow through the pipeline 30. The disc plug 10 of the present invention is preferably constructed of a tough plastic composition, such as polystyrene or like material, enabling the plug to withstand pressure as well as to break along the breakage grooves when subjected to a removal tool.

Figure 4:
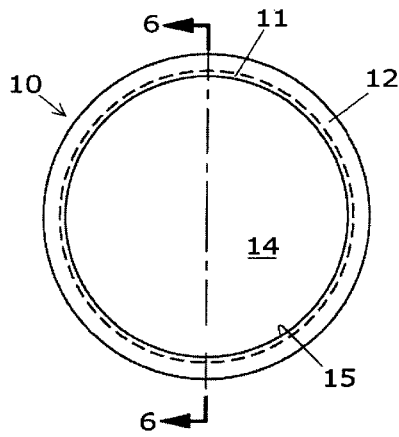
FIG. 4 is an elevational view of the frangible sealing plug of the present invention.
Figure 5:
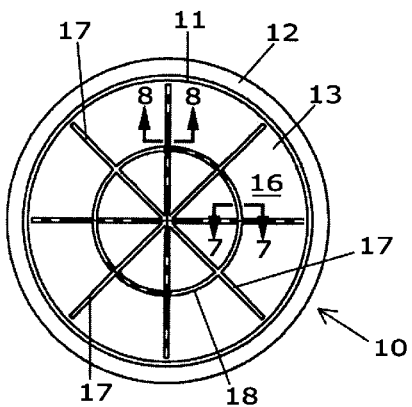
FIG. 5 is an elevational view of the opposite side of the frangible sealing plug shown in FIG. 4.
Figure 6:
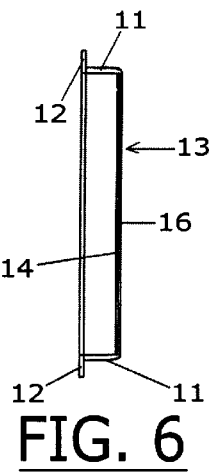
FIG. 6 is a sectional view of the frangible sealing plug taken along line 6—6 of FIG. 4.

FIG. 4 shows the sealing plug 10 having a peripheral parting line 15 disposed around the circumference of surface 14 of disc shaped body 13 and adjacent the annular ring 11. Referring to FIGS. 4–6, the frangible sealing plug 10 has a disc shaped body 13 comprised of opposing surfaces 14 and 16. The unitary structure of the plug 10 has an annular ring member 11 and peripheral outer lip 12 which are utilized to secure the plug 10 in a pipeline as shown in FIGS. 1–3. The peripheral parting line 15 is shown positioned adjacent ring portion 11 on surface 14 which is the upstream side of the plug 10. The plurality of intersecting parting lines 17 are shown positioned in surface 16, which is opposite or downstream of surface 14. The parting lines 17 are shown extending in the disc shaped body within the confines of the peripheral score line 15 on the opposite side. Parting line 15 preferably has a depth of approximately half the thickness of disc shaped body 13 as further shown in FIG. 9. Parting line 15 is shown to have a flat portion and has an angular cross-section of approximately 10° with respect to a line normal the flat bottom and the side of ring portion 11, however, any suitable angle may be used. Ring portion 11 is shown extending from disc shaped body 13 to peripheral lip 12 which provides means to abut and secure the plug 10 to a pipe section end.

Figure 7:
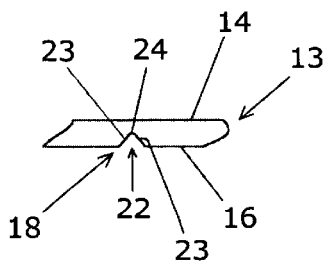
FIG. 7 is a sectional view of a score line of the frangible sealing plug taken along line 7—7 of FIG. 5.
Figure 8:
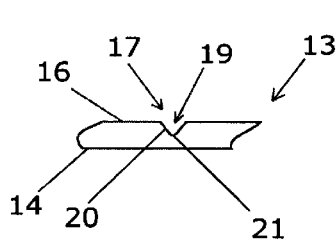
FIG. 8 is a sectional view of a score line of the frangible sealing plug taken along line 8—8 of FIG. 5.

FIG. 5 shows the sealing plug 10 having surface 16 with radially disposed parting lines 17 and a concentric parting line 18. As shown in FIGS. 7 and 8, parting lines 18 and 17, respectively, are shown to have an angular cross-section, with a flattened base portion at the apex. Parting lines 17 have a common center and are shown arranged radially from the center. Parting line 18 is a concentric circle and has a diameter of approximately half of the diameter of disc shaped body 13. Parting lines 17 and 18 preferably have a depth of approximately half of the thickness of disc shaped body 13. The depth of the parting lines is dependent upon the composition of the plug body. Parting lines 17 are shown to not extend to the end of surface 16 of disc shaped body 13. Disc shaped body 13 is constructed to break into a plurality of pieces at parting line 15 and parting lines 17 and 18 when a removal tool is utilized. For example, a cutting, pushing and/or rotating action may be applied to surface 14 by a removal tool 27, as shown in FIG. 3, leaving ring portion 11 and outer lip 12 between the pipe sections and restoring fluid flow through pipeline 30.

FIG. 6 shows a sectional view of disc plug 10 and where the disc shaped body 13 is shown having ring portion 11 and peripheral outer lip 12. Disc shaped body 13 has opposing surface 14 and surface 16 as also shown in FIGS. 4 and 5, respectively. The sealing plug 10 is preferably constructed of a plastic composition, such as polystyrene or like material.

FIG. 7 shows a cross-section of parting line 18. The depth of parting line 18 is approximately half the thickness of disc shaped body 13. Parting line 18 has an opening 22, a flattened bottom 24, and sides 23. Sides 23 are shown to form an angle, such as approximately 90°, for example. The flat bottom 24 and the angle defined by sides 23 define the break line 18. Although a right angle has been found suitable for breakage of the plug body, other cross-sectional parting line angles may be used depending upon the composition of the plug body.

FIG. 8 shows a cross-section of a parting line 17. The depth of parting lines 17 is shown to be approximately half the thickness of disc shaped body 13. Parting lines 17 have an opening 19, a flattened bottom 21, and sides 20. Sides 20 are also shown to form an angle, such as approximately 90°. As with the cross-sectional angle of each parting line 18 any suitable angle may be utilized. The cross-sectional configuration of the parting line provides the localization or concentration of the removal force along the parting lines in the plug body.

Figure 9:
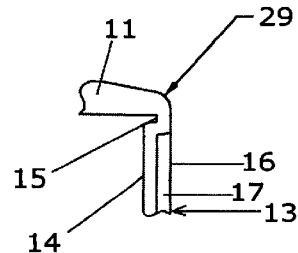
FIG. 9 is a sectional view of the peripheral score line of the frangible sealing plug of FIG. 4.

FIG. 9 shows a cross-section of parting lines 15 and 17. Ring portion 11 is shown extending from disc shaped body 13 along rounded edge 29. Parting line 15 is shown abutting ring portion 11 in the surface 14 of disc shaped body 13. Parting line 15 is shown having a flat bottom portion and forming an angle of approximately 10° with respect to a line normal to the flat bottom portion and ring portion 11, however, any suitable angle may be used. Parting lines 17 of disc shaped body 13 are shown positioned in surface 16 of the disc shaped body 13.

In summary, the frangible sealing plug is constructed and arranged to temporarily seal a pipeline. The unitary plug body is preferably a molded plastic structure such as polystyrene. As shown in the drawings, the plug body has rounded edges about its various features and particularly a plurality of parting lines are provided which cooperate with a peripheral parting line to permit a predictable breakage of the plug body when subjected to a removal tool. The thickness of the parting lines into the plug body is dependent on the composition of the sealing plug body. Although the teachings of the invention relate to frangible plugs adapted for use in sewer pipelines having an internal diameter of three and four inches, for example, it is within the purview of the invention to provide frangible plugs for use in various pipelines and pipeline diameters As many changes are possible to the embodiments of this invention, utilizing the teachings thereof, the description above, and the accompanying drawings should be interpreted in the illustrative, and not the limited sense.

That which is claimed is:

1. A frangible sealing plug for pipelines comprising:
    a) a disc shaped fluid impermeable body having a peripheral member for sealing abutment against the end of a pipeline section, said disc shaped body having a first side, a second side, a diameter and a body thickness;
    b) a plurality of score lines disposed in said first side of said disc shaped body; and
    c) a continuous peripheral score line disposed in said second side of said disc shaped body, said plurality of score lines extending in said first side of said disc shaped body and terminating spacially opposite adjacent said peripheral score line in said second side, whereby said sealing plug is constructed and arranged to be secured in a pipeline at the end of a pipe section and to hold a predetermined fluid backpressure and wherein said score lines in said first side and second sides of said disc shaped body cooperate to separate said disc shaped body into a plurality of pieces along said peripheral score line when engaged by a removal device.

2. The frangible sealing plug of claim 1, wherein each said score line of said plurality of score lines has an angular cross-sectional configuration.

3. The frangible sealing plug of claim 2, wherein said plug body is constructed of a plastic material and wherein said angular cross-sectional score line configuration is an angle of approximately 90°.

4. The frangible sealing plug of claim 2, wherein each said score line has a flattened base portion at its apex.

5. The frangible sealing plug of claim 1, wherein peripheral member comprises an annular ring and lip portion extending from said disc shaped body.

6. The frangible sealing plug of claim 1, wherein plurality of score lines and said plurality of score lines and said peripheral score line extend into said body approximately one half said body thickness.

7. The frangible sealing plug of claim 1, wherein said plurality of score lines in said first side include a plurality of radiating score lines and at least one concentric score line.

8. The frangible sealing plug of claim 7, wherein said disc shaped body has a center and wherein said concentric score line in said first side is positioned spaced between said center and said peripheral score line and wherein at least one of said plurality of score lines in said first side extend through said center.

9. The frangible sealing plug of claim 1, wherein said disc shaped body is molded of a plastic composition.

10. The frangible sealing plug of claim 1, wherein said plurality of score lines and said peripheral score line in said disc shaped body are constructed and arranged to cooperate to break into a plurality of pieces along said score lines when subjected to the action of a removal tool.

11. A frangible sealing plug for temporarily sealing a pipeline comprising:
    a) an impermeable body portion having peripheral means for securement in a pipeline;
    b) said body portion having a first side, a second side and a plurality of score lines constructed and arranged in said body portion to cause said body portion to be separated into a plurality of pieces, said plurality of score lines comprising a peripheral score line positioned adjacent said peripheral means for securement and further having a plurality of intersecting score lines, said plurality of intersecting score lines including at least one elongated score line and at least one generally round score line.

12. The frangible sealing plug of claim 11, wherein said peripheral means for securement of said body portion comprises a ring and a peripheral lip.

13. The frangible sealing plug of claim 11, wherein said peripheral score line is on said first side and said plurality of intersecting score lines are on said second side of said body portion.

14. The frangible sealing plug of claim 11, wherein said impermeable body portion is constructed of a plastic composition and wherein each said score line has a generally V-shaped cross-section.

15. The frangible sealing plug of claim 11, wherein said disc shaped body has a thickness and each said score line has a thickness of approximately half of said thickness of said disc shaped body.

16. A frangible sealing plug for temporarily sealing pipelines comprising:
    a) a fluid impermeable body having a center and a plurality of score lines;
    b) said body portion having a peripheral sealing edge for securement in a pipeline;
    c) a peripheral parting line adjacent to said peripheral sealing edge; and
    d) a concentric score line positioned between said center and said peripheral sealing edge of said body.

17. The frangible sealing plug of claim 16, wherein said peripheral sealing edge comprises a ring portion and a peripheral lip.

18. The frangible sealing plug of claim 17, wherein said impermeable body is disc-like in shape and has an upstream side and a downstream side, wherein said sealing plug is constructed of a plastic composition and wherein said peripheral parting line is disposed on said upstream side and said plurality of score lines are disposed on said downstream side.

19. The frangible sealing plug of claim 17, wherein said plurality of score lines are arranged radially from a common center.

20. The frangible sealing plug of claim 19, wherein each said score line has a generally V-shaped cross-section.

21. A method for temporarily sealing a pipeline comprising:
  a) securing a frangible sealing plug in a pipeline system, said disc plug being constructed and arranged to separate into a plurality of pieces and having a peripheral breaking line in alignment with the inner diameter of said pipeline, said frangible sealing plug further being comprised of a disc shaped body and a sealing means, said peripheral breaking line being peripherally disposed between said disc shaped body and said sealing means, said disc shaped body further having at least one score line;
  b) testing the pipeline system for leaks;
  c) breaking the plug into a plurality of pieces by an upstream force along said peripheral breaking line and said at least one score line; and
  d) flushing said pieces down said pipeline to restore full fluid flow in said pipeline.

22. The method of claim 21, wherein said pipeline has an access member through which said upstream force is applied to said frangible sealing plug.

23. A frangible sealing plug for pipelines comprising:
  a) a disc shaped fluid impermeable body having a peripheral member for sealing abutment against the end of a pipeline section, said disc shaped body having a first side, a second side, a diameter and a body thickness;
  b) a plurality of score lines disposed in said first side of said disc shaped body, said plurality of score lines including at least one elongated score line and at least one generally round score line intersecting said at least one elongated score line; and
  c) a peripheral score line disposed in said second side of said disc shaped body, whereby said sealing plug is constructed and arranged to be secured in a pipeline and to hold a predetermined fluid backpressure and wherein said plurality of score lines in said first side and said peripheral score line in said second side of said disc shaped body cooperate to separate said disc shaped body into a plurality of pieces along said peripheral score line when engaged by a removal device.

24. The frangible sealing plug of claim 23 wherein said disc shaped impermeable body is constructed of a plastic material.

25. The frangible sealing plug of claim 23 wherein said peripheral member comprises an annular ring and lip portion extending from said disc shaped body.

* * * * *